United States Patent [19]

Shoji et al.

[11] Patent Number: 4,513,132

[45] Date of Patent: Apr. 23, 1985

[54] HEAT-RESISTANT SILICONE BLOCK POLYMER

[75] Inventors: Fusaji Shoji; Issei Takemoto; Fumio Kataoka, all of Yokohama; Hitoshi Yokono; Tokio Isogai, both of Katsuta, all of Japan

[73] Assignee: Hitachi, Ltd., Tokyo, Japan

[21] Appl. No.: 480,789

[22] Filed: Mar. 31, 1983

[30] Foreign Application Priority Data

Apr. 2, 1982 [JP] Japan ................................. 57-53815

[51] Int. Cl.³ .............................................. C08G 77/06
[52] U.S. Cl. ......................................... 528/21; 528/33; 528/35; 528/40; 528/41; 528/42; 528/43; 524/731; 524/477
[58] Field of Search ....................... 528/21, 33, 35, 40, 528/41, 42, 43; 524/731; 525/477

[56] References Cited

U.S. PATENT DOCUMENTS

| | | | |
|---|---|---|---|
| 2,383,817 | 8/1945 | Rochow | 528/35 |
| 2,562,000 | 7/1951 | Sveda | 528/35 |
| 3,017,386 | 1/1962 | Brown, Jr. et al. | 528/21 |
| 3,202,634 | 8/1965 | Merker | 528/43 |
| 3,278,461 | 10/1966 | Wu | 528/35 |
| 3,294,737 | 12/1966 | Krantz | 528/21 |
| 3,318,844 | 5/1967 | Krantz | 528/21 |
| 3,372,133 | 3/1968 | Krantz | 528/43 |
| 3,398,175 | 8/1968 | Leitheiser | 528/35 |

FOREIGN PATENT DOCUMENTS 828  1/1981  Japan ................................. 528/35

*Primary Examiner*—Melvyn I. Marquis
*Attorney, Agent, or Firm*—Antonelli, Terry & Wands

[57] ABSTRACT

Heat-resistant silicone block polymer with a good flexibility obtained by reaction of an organosilsesquioxane with a silicone compound or organosiloxane in the presence of a basic catalyst in an organic solvent.

7 Claims, No Drawings

HEAT-RESISTANT SILICONE BLOCK POLYMER

BACKGROUND OF THE INVENTION

1. Field of the Invention

This invention relates to a heat-resistant silicone block polymer.

2. Description of the Prior Art

Heat-resistant silicone block polymers obtained from arylsilsesquioxane represented by the following general formula (1):

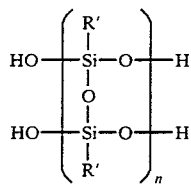 (1)

wherein R' is an aryl group and n is a positive integer of 25 to 500, and a silicone compound represented by the following general formula (2):

$$Y(R''_2SiO)_m R''_2SiY \quad (2)$$

wherein R'' is an alkyl group or an aryl group, Y is a halogen atom or a hydroxyl group, and m is a positive integer of 1 to 1,000 (U.S. Pat. No. 3,294,737) and those obtained from methylpolysiloxane having a number mean molecular weight of 9,000 to 10,000 represented by the following general formula (3):

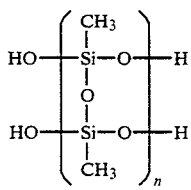 (3)

and a silicone compound represented by the following general formula (4):

$$XR'''_2Si(CH_2)_l(R_2SiO)_m Si(CH_2)_l SiR'''_2X \quad (4)$$

(Japanese Patent Application Kokai (Laid-open) No. 56-828) are well known. However, all of these silicone block polymers have a substantial flexibility but have a poor heat resistance.

SUMMARY OF THE INVENTION

An object of the present invention is to provide silicone block polymers having a substantial flexibility and an excellent heat resistance, and the object can be attained by converting a material having a substantial flexibility to that having a heat resistance. More particularly, the object can be attained by silicone block polymers obtained by reaction of organosilsesquioxane represented by the following general formula (5):

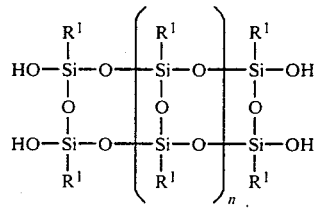 (5)

wherein $R^1$ is a lower alkyl group having 1 to 5 carbon atoms, and/or an aryl group such as phenyl, tolyl, etc., and n is an integer of 0 to 4,000, with a silicone compound or organosiloxane represented by the following general formula (6) or (7) in an organic solvent in the presence of a basic catalyst:

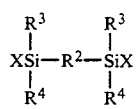 (6)

wherein $R^2$ is an arylene group such as

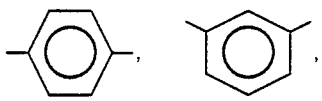

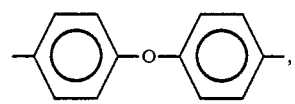

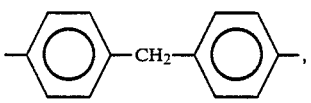

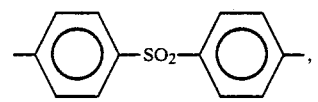

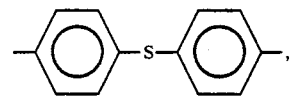

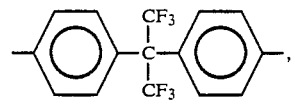

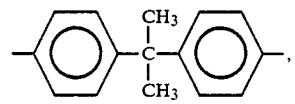

etc. or a xylylene group such as

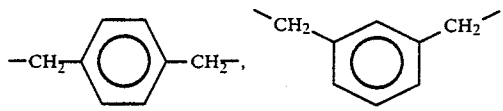

etc., preferably a phenylene group, R³ and R⁴ are lower alkyl groups having 1 to 5 carbon atoms, alkenyl groups such as vinyl, allyl, methacroyl, etc. and/or aryl groups such as phenyl, tolyl, etc., preferably methyl groups or vinyl groups, X is a chlorine atom, a hydroxyl group, an alkoxy group such as methoxy, ethoxy, propoxy, etc., or an N,N-dialkylamino group such as N,N-dimethylamino, N,N-diethylamino, etc., preferably a chlorine atom or a hydroxyl group; and

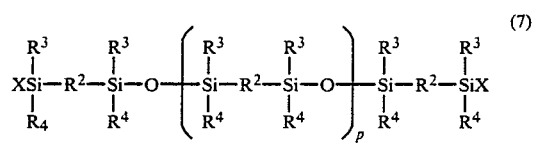
(7)

wherein $R^2$, $R^3$, $R^4$ and X have the same meanings as defined above, and p is an integer of 0–100, preferably an integer of 0–50.

The compound represented by the general formula (5) includes, for example, phenylsilsesquioxane, chlorophenylsilsesquioxane, diphenylsilsesquioxane, naphthylsilsesquioxane, tolylsilsesquioxane, cyanophenylsilsesquioxane, benzoylphenylsilsesquioxane, p-phenoxyphenylsilsesquioxane, methylsilsesquioxane, ethylsilsesquioxane, propylsilsesquioxane, tertbutylsilsesquioxane, etc., among which phenylsilsesquioxane and methylsilsesquioxane are preferable. The organosilsesquioxanes of the formula (5) have a number mean molecular weight of about 1,000 to about 600,000.

The compounds represented by the formulae (6) and (7) include, for example, bis(hydroxydimethylsilyl)benzene, bis(hydroxydiphenylsilyl)benzene, bis(hydroxydivinylsilyl)benzene, polytetramethyl-p-silphenylenesiloxane, polytetraphenyl-p-silphenylenesiloxane, polytetravinyl-p-silphenylenesiloxane, etc., among which polytetramethyl-p-silphenylenesiloxane and polytetraphenyl-p-silphenylenesiloxane are preferable.

The mixing ratio of the compound of the formula (5) to the compound of the formula (6) or (7) depends upon the species of the compounds, but is 100:5–400 by weight, preferably 100:20–200 by weight. Below 100:5, the flexibility is lost, whereas above 100:400, the heat resistance is lowered.

In the reaction of the compound of the formula (5) with the compound of the formula (6) or (7), a basic catalyst such as tert-amines, for example, pyridine, triethylamine, picoline, quinoline, N,N-dialkylaniline, etc. is used. When the compound of the formula (6) or (7) has a hydroxyl group as X, tetramethylammonium acetate, n-hexylamino-2-ethylhexoate, tetramethylguanidine-2-ethylhexoate, piperidine, triethanolamine, 1,4-diazobicyclo-[2,2,2]octane, etc. are used as the basic catalyst. 0.1–200 parts by weight of the basic catalyst is used per 100 parts by weight of the organosilsesquioxane of the formula (5).

The organic solvent for use in the reaction includes, for example, an aromatic hydrocarbon such as benzene, toluene, methoxybenzene, veratrole, diphenyl, diphenylether, etc.; a halogenated alkane such as dichloromethane, chloroform, etc., an ether such as diethylether, diisopropylether, tetrahydrofuran, etc.; a ketone such as acetone, methylisobutylketone, etc.; and a polar solvent such as N-methyl-2-pyrolidone, N-cyclohexyl-2-pyrolidone, etc.; preferably an aromatic hydrocarbon.

The reaction of the compound of the formula (5) with the compound of the formula (6) or (7) depends upon the boiling point of the organic solvent and the species of X in the compound of the formula (6) or (7), but can be carried out at 50°–200° C. for 5–50 hours.

The structure of the present heat-resistant silicone block polymer can be principally represented as follows:

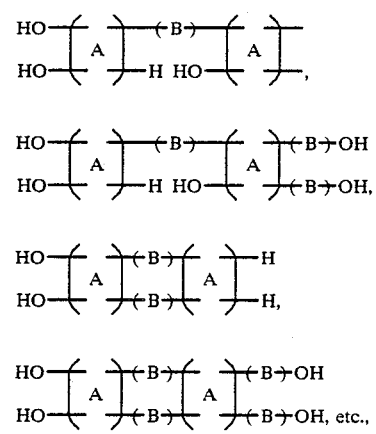

where (A) means an organosilsesquioxane unit, that is:

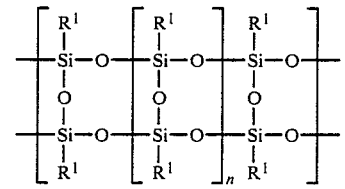

and (B) means a tetraorganosilarylenesiloxane or tetraorganosilxylylenesiloxane unit, that is:

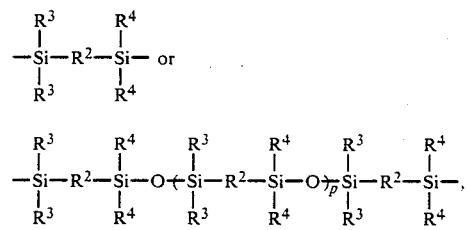

wherein $R^1$ is a lower alkyl group having 1 to 5 carbon atoms, and/or an aryl group, $R^2$ is an arylene group, $R^3$ and $R^4$ are lower alkyl groups having 1 to 5 carbon atoms, alkylene group and/or aryl groups, n is an integer of 1 to 4,000, and p is an integer of 0 to 100.

The present heat-resistant silicone block polymer has a good adhesiveness to inorganic materials, for example, glass, silicon, metal such as aluminum, chromium, copper, etc., metal oxides, silicon nitride, etc., and also has a good heat-resistant property and a good mechanical strength, and thus can be used as an insulating film for solid elements in the semiconductor industry or as an interlayer insulating film for multi-layer wirings, or as an insulating film for print circuit boards.

In those applications, the present heat-resistant silicone block polymer is, for example, dissolved in an appropriate solvent, and the resulting solution is applied to a substrate of, for example, silicon, glass, etc. and then cured by heating, whereby an insulating film having a thickness of a few hundred to a few ten Å can be obtained.

In the curing by heating, a curing catalyst and an additive such as an adhesive promoter, etc. can be used, if desired. The curing catalyst can include, for example, silanol-based compounds and titanol-based compounds, and the adhesive promoter includes, for example, aminopropyltriethoxysilane, γ-methacryloxypropyltrimethoxysilane, vinyltriethoxysilane, etc. besides the curing catalyst. If necessary, a substrate treated with a silanol-based compound such as polydihydroxysilane and polydialkoxysilane, a titanol-based compound such as polydialkoxytitanate and tetraalkoxytitanate, or an aluminum chelating compound such as aluminum monoethylacetate diisopropilate can be used to improve adhesion between the present heat-resistant silicone block polymer and the substrate.

DESCRIPTION OF THE PREFERRED EMBODIMENTS

The present invention will be described in detail below, referring to Examples.

EXAMPLE 1

50 g (0.025 moles) of hydroxyl-terminated phenylsilsesquioxane (number mean molecular weight: 2,000), 40 g of benzene solution containing 1.5 g of tetramethylammonium acetate (0.3% by weight on the basis of the polymer), 200 g of diphenyl ether, 200 g of toluene, and 2.8 g (0.0125 moles) of p-bis(dimethylhydroxysilyl)benzene were charged into a 4-necked flask with a capacity of 500 ml, and dissolved with stirring. The resulting homogeneous solution was heated at 90° C. for 2 hours with stirring, and the resulting block polymer solution was poured into a mixed solvent of methanol-acetone (1:1 by volume) to precipitate polymer. The precipitates were recovered by filtration, washed with water and dried at 100° C., whereby the polymer having a number mean molecular weight of about 18,000 was obtained. The polymer had a heat resistance up to about 500° C. and the film prepared therefrom had a better flexibility than phenylsilsesquioxane.

EXAMPLE 2

55 g (0.011 mole) of hydroxyl-terminated phenylsilsesquioxane (number mean molecular weight: 5,000), 19.8 g (0.11 mole) of compound having the following formula (number mean molecular weight: 1,800):

phenylsilsesquioxane were charged into a 4-necked flask with a capacity of 500 ml, and dissolved with stirring. The resulting homogenous solution was distilled by heating at 130° C. for 4 hours with stirring to remove toluene therefrom, and the resulting reaction product solution was poured into a mixed solvent of methanol-acetone (1:1 by volume) to precipitate polymer. The precipitates were recovered by filtration, washed with water and dried at 120° C. under a reduced pressure, whereby block polymer having a number mean molecular weight of about 42,000 was obtained. The polymer had a heat resistance up to about 480° C. and the film prepared therefrom had a good flexibility.

EXAMPLE 3

40 g (0.004 moles) of hydroxyl-terminated phenylsilsesquioxane (number mean molecular weight: 10,000), 8.89 g (0.0405 moles) of p-bis(diphenylhydroxysilyl)benzene, and 200 g of toluene solution containing 0.5% by weight of tetramethylguanidine-di-2-ethylhexoate on the basis of the polymer were charged into a 4-necked flask with a capacity of 500 ml, and dissolved with stirring. The resulting homogeneous reaction solution was heated at the reflux temperature (about 110° C.) for 8 hours. The resulting reaction product solution was poured into a mixed solvent of methanol-acetone (1:1 by volume) to precipitate polymer. The precipitates were recovered by filtration, washed with water and dried at 100° C. under a reduced pressure, whereby polymer having a number mean molecular weight of 83,000 was obtained. The polymer had a heat resistance up to 520° C. and the film prepared therefrom had a good flexibility.

EXAMPLES 4–11

In these Examples, reagents shown in Table were mixed and subjected to reaction in the same manner as in Example 1 under reaction conditions as shown in Table, and results are shown in Table.

COMPARATIVE EXAMPLE 50 g (0.025 moles) of hydroxyl-terminated phenylsilsesquioxane (number mean molecular weight: 2,000), 50 g of benzene solution containing 1.6 g of tetramethylammonium acetate (0.3% by weight on the basis of the polymer), 200 g of diphenylether and 200 g of toluene were admixed with 5 g of pyridine and then with 3 g of Cl[(CH$_3$)$_2$SiO]$_{10}$(CH$_3$)$_2$SiCl and then the mixture was subjected to reaction at 50° C. for 15 hours. The reaction product solution was poured into a mixed solvent of methanol-acetone (1:1 by volume) to precipitate block polymer. The resulting polymer was washed with methanol and then with water, and then dried at 50° C. under a reduced pressure, whereby the block polymer having a number mean molecular weight of about 6,000 was obtained. The polymer had a heat resistance up to about 350° C., and the film prepared therefrom had a

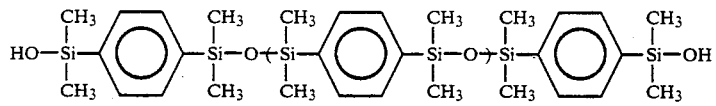

200 g of diphenylether, 100 g of toluene, and a toluene solution containing 0.5% by weight of tetramethylammonium acetate on the basis of the hydroxyl-terminated good flexibility. In other words, the product polymer had a lower heat resistance than the phenylsilsesquioxane as the raw material.

TABLE

| Ex. No. | Polymer [I] Compound | Number mean M.W. | g | Compound or polymer [II] Compound name or polymer structure | Number mean M.W. | g |
|---|---|---|---|---|---|---|
| 4 | Hydroxyl-terminated polymethyl-silsesquioxane | 5,000 | 12 | p-bis-(dimethylhydroxysilyl)benzene | — | 48 |
| 5 | Hydroxyl-terminated polymethyl-silsesquioxane | " | 12 | HO—Si(CH$_3$)$_2$—C$_6$H$_4$—Si(CH$_3$)$_2$—O—[Si(CH$_3$)$_2$—C$_6$H$_4$—Si(CH$_3$)$_2$—O]$_{77}$—Si(CH$_3$)$_2$—C$_6$H$_4$—Si(CH$_3$)$_2$—OH | 2,000 | 10 |
| 6 | Hydroxyl-terminated polymethyl-silsesquioxane | " | 12 | " | 10,000 | 24 |
| 7 | Hydroxyl-terminated polymethyl-silsesquioxane | " | 20 | p-bis(diphenylhydroxysilyl)benzene | — | 2 |
| 8 | Hydroxyl-terminated polyphenyl-silsesquioxane | 30,000 | 15 | " | — | 20 |
| 9 | Hydroxyl-terminated polyphenyl-silsesquioxane | 30,000 | 15 | HO—Si(CH$_3$)$_2$—C$_6$H$_4$—Si(CH$_3$)$_2$—O—[Si(CH$_3$)$_2$—C$_6$H$_4$—Si(CH$_3$)$_2$—O]$_{22}$—Si(CH$_3$)$_2$—C$_6$H$_4$—Si(CH$_3$)$_2$—OH | 5,000 | 50 |
| 10 | Hydroxyl-terminated polyphenyl-silsesqioxane | " | 15 | HO—Si(CH$_3$)$_2$—CH$_2$—C$_6$H$_4$—CH$_2$—Si(CH$_3$)$_2$—OH | — | 0.8 |
| 11 | Hydroxyl-terminated polyphenyl-silsesquioxane | " | 15 | HO—Si(CH$_3$)$_2$—CH$_2$—C$_6$H$_4$—CH$_2$—Si(CH$_3$)$_2$—OH | — | 1.2 |

| Catalyst and solvent (% by weight based on polymer) | Solvent (g) | Reaction Temp. (°C.) | Reaction Time (hr) | Number mean M.W. | Heat resistance (°C.) | Flexibility |
|---|---|---|---|---|---|---|
| Toluene solution of tetramethyl-guanidine-diethylhexoate (0.5) | Diphenylether 110 | 130 | 8 | 46,000 | Up to 520 | Good |
| Benzene solution of tetramethylammonium acetate (0.5) | Toluene 300 | 100 | 5 | 61,000 | Up to 500 | Good |
| Benzene solution of tetramethylammonium acetate (0.5) | Toluene 300 | 95 | 2 | 43,000 | Up to 450 | Good |
| Benzene solution of tetramethylammonium acetate (0.5) | Diphenylether 180 | 120 | 5 | 49,000 | Up to 530 | Good |
| Benzene solution of tetramethylammonium acetate (0.5) | Benzene 130 | 80 | 7 | 83,000 | Up to 510 | Good |
| 1,4-bisazabicyclo-[2,2,2]octane (2.5) | Toluene 500 | 100 | 4 | 54,000 | Up to 460 | Good |
| 1,4-bisazabicyclo-[2,2,2]octane (2.5) | Toluene 500 | 100 | 4 | 71,000 | Up to 490 | Good |
| 1,4-bisazabicyclo-[2,2,2]octane (2.5) | Toluene 500 | 100 | 4 | 61,000 | Up to 460 | Good |

What is claimed is:

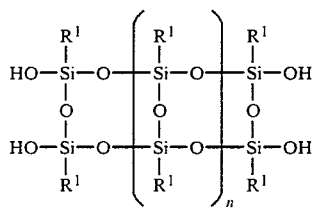

wherein $R^1$ is a lower alkyl group having 1 to 5 carbon atoms and/or an aryl group and n is an integer of from 0 to 4,000, with 5 to 400 parts by weight of a silicone compound or organosiloxane represented by the formula (6) or (7):

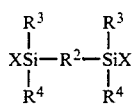

wherein $R^2$ is an arylene group, $R^3$ and $R^4$ are lower alkyl groups having 1 to 5 carbon atoms, alkenyl groups and/or aryl groups, and X is a chlorine atom, a hydroxyl group, an alkoxy group or an N,N-dialkylamino group, or

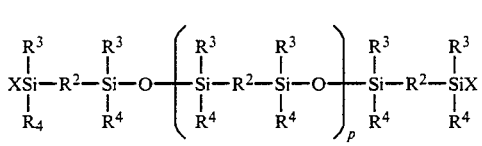

wherein $R^2$, $R^3$ and $R^4$ and X have the same meanings as defined heretofore and p is an integer of from 0 to 100, in an organic solvent and in the presence of 0.1 to 200 parts by weight of a basic catalyst per 100 parts by weight of the compound of the general formula (5).

2. A heat-resistant silicone block polymer according to claim 1, wherein said basic catalyst is selected from the group consisting of pyridine, triethylamine, picoline, quinoline, and N,N-dialkylaniline when X is a chlorine atom, an alkoxy group or an N,N-dialkylamino group in a compound of the formula (6) or (7) and the basic catalyst is selected from the group consisting of pyridine, triethylamine, picoline, quinoline, N,N-dialkylaniline, tetramethylammonium acetate, n-hexylamino-2-ethylhexoate, tetramethylguanidine-di-2-ethylhexoate, piperidine, triethanolamine, and 1,4-diazobicyclo[2,2,2]-octane when X is a hydroxyl group in the compound of the general formula (6) or (7).

3. A heat-resistant silicone block polymer according to claim 1, wherein the organosilsesquioxane represented by the formula (5) is a hydroxyl-terminated compound selected from the group consisting of phenylsilsesquioxane, chlorophenylsilsesquioxane, diphenylsilsesquioxane, naphthylsilsesquioxane, tolylsilsesquioxane, cyanophenylsilsesquioxane, benzoylphenylsilsesquioxane, p-phenoxyphenylsilsesquioxane, methylsilsesquioxane, ethylsilsesquioxane, propylsilsesquioxane and tertbutylsilsesquioxane; the compound of the formula (6) is selected from the group consisting of bis(hydroxydimethylsilyl)benzene, bis(hydroxydiphenylsilyl)benzene, bis(hydroxydivinylsilyl)benzene; and the compound of formula (7) is selected from the group consisting of polytetramethyl-p-silphenylenesiloxane, polytetraphenyl-p-silphenylenesiloxane and polytetravinyl-p-silphenylenesiloxane.

4. A heat-resistant silicone block polymer according to claim 1, wherein said organic solvent is an aromatic hydrocarbon, halogenated alkane and ether, a ketone, a polar solvent or a mixture thereof.

5. A heat-resistant silicone block polymer according to claim 1, wherein said organic solvent is benzene, toluene, methoxybenzene, veratrole, diphenyl, diphenylether, dichloromethane, chloroform, diethylether, diethylpropyl ether, tetrahydrofuran, acetone, methylisobutyl ketone, N-methyl-2-pyrolidone, N-cyclohexyl-2-pyrolidone or a mixture thereof.

6. A heat-resistant silicone block polymer according to claim 1, wherein the reaction is effected at 50° C. to 200° C. for 5 to 50 hours.

7. A heat-resistant silicone block polymer according to claim 1, wherein the arylene group is selected from the group consisting of

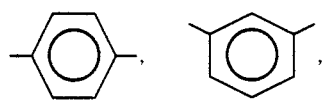

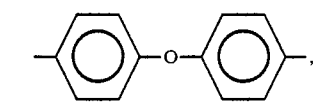

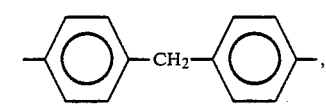

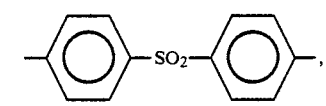

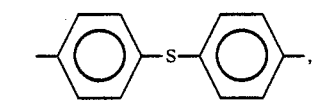

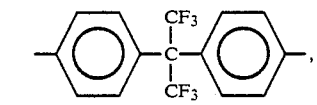

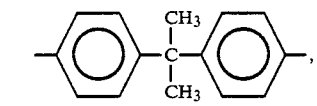

and a xylylene group, and the aryl group is selected from the group consisting of phenyl and tolyl.

* * * * *